United States Patent [19]
Sakamoto et al.

[11] Patent Number: 4,720,141
[45] Date of Patent: Jan. 19, 1988

[54] SEAT FOR VEHICLES

[75] Inventors: Takao Sakamoto, Akishimashi; Tadayoshi Komatsu, Okazakishi, both of Japan

[73] Assignee: Tachikawa Spring Co., Ltd., Tokyo, Japan

[21] Appl. No.: 911,127

[22] Filed: Sep. 24, 1986

Related U.S. Application Data

[63] Continuation-in-part of Ser. No. 693,263, Jan. 22, 1985.

[51] Int. Cl.$^4$ ............................................. A47C 3/00
[52] U.S. Cl. .................................. 297/284; 297/232; 297/313
[58] Field of Search ............... 297/284, 433, 423, 337, 297/232, 313; 248/397, 396

[56] References Cited

U.S. PATENT DOCUMENTS

| | | | |
|---|---|---|---|
| 3,362,746 | 1/1968 | Huyge | 297/313 |
| 3,632,157 | 1/1972 | Lohr | 297/232 |
| 3,695,570 | 10/1972 | Ishida | 248/397 |
| 4,343,509 | 8/1982 | Lundgren | 297/232 |
| 4,491,365 | 1/1985 | Murakanic | 297/284 X |
| 4,522,445 | 6/1985 | Goldner et al. | 297/284 |
| 4,632,452 | 12/1986 | Vogel | 297/232 |

Primary Examiner—Francis K. Zugel
Attorney, Agent, or Firm—Hoffmann & Baron

[57] ABSTRACT

The present invention is an improvement in seat construction for seating at least two passengers which includes a seat frame having front and back sides running the length of the frame and left and right sides running transverse of the frame, and is adapted to support at least two passenger seats. In particular, the present invention includes independent thigh support devices for each of the passengers, and a cushion member for each of the passengers which extend from the back of the seat frame and are arranged on each of the thigh support devices for simultaneous movement therewith and each of which have a perimeter dimension for supporting a passenger. Each of the thigh support devices, in turn, includes a thigh support frame pivotally fixed to the back of the seat frame for upward and downward rotation each thigh support frame formed so that it is substantially coextensive with the perimeter of each cushion member. Thus, up and down movement of each of the thigh support frames coextensively adjust each of the cushion members in up and down positions so that thigh support for a passenger on each of the cushion members is maintained substantially coplanar at all times during and between adjustments.

2 Claims, 6 Drawing Figures

SEAT FOR VEHICLES

This is a continuation-in-part of copending application Ser. No. 693,263, filed on Jan. 22, 1985.

BACKGROUND OF THE INVENTION

The present invention relates to a seat for vehicles, and particularly relates to improvements in multi-passenger seat construction, such as a double bench seat.

In conventional seats for vehicles, such as shown in FIG. 1, only thigh support portions $a_1'$ and $a_1''$ of the portions $a'$ and $a''$ on which a passenger sits elevates, while the corner portions $a_2'$ and $a_2''$ at the outside of the thigh support portions are secured against adjustment to a seat frame.

As is clear from FIG. 1, a difference in level between the thigh support portions and the corner portions $a_2'$ and $a_2''$ is experienced in these conventional vehicle seats when the thigh support portions $a_1'$ and $a_1''$ are caused to rise. This detracts from a sense of security of the body of a passenger. Furthermore, the corner portions $a_2'$ and $a_2''$ are relatively depressed at the perimeter of the seat when a passenger is getting on and off the car seat. The difference in level between the thigh support portions $a_1'$ and $a_1''$ and the respective corner portions is sufficient to impair the comfort and appearance of the seat.

Furthermore, at the time of assembly of one of these conventional seats, it is necessary to provide a cushioning member and a top layer member for each of the thigh support portions $a'$ and $a''$ as a detached body from the corner portions $a_2'$ and $a_1''$. Thus, the process for manufacturing and productivity are considered poor.

It is an object of the present invention to provide a seat for vehicles wherein an adjustable thigh support portion is extended to the perimeter of a passenger support cushion including the corner portion of a conventional seat so that the thigh support portions substantially coincide with the left and right sides of the seat frame even while being adjusted in the up and down directions.

SUMMARY OF THE INVENTION

The present invention is an improvement in a seat construction for occupation by at least two passengers which includes a seat frame having front and back sides running the length of the frame and having left and right sides running transverse of the frame and is adapted to support at least two passenger seats. In particular, the present invention includes independent thigh support devices for each of the passengers, and a cushion member which has a perimeter dimension for supporting a passenger. The cushion member extends from the back of the seat frame and is arranged on each of the thigh support devices for simultaneous movement therewith. Each thigh support device, in turn, includes a thigh support frame pivotally fixed to the back of the seat frame for upward and downward rotation, each of the thigh support frames formed so that it is substantially coextensive with the perimeter of each of the cushion members. Accordingly, up and down movement of each of the thigh support frames coextensively adjust to each of the cushion members in up and down positions so that the thigh support for a passenger in each of the cushion members is maintained substantially coplanar at all times during and between adjustments.

In a preferred embodiment, the present improved seat construction also contemplates inclusion of a rotation lock for fixing the seat frame at various levels of upward adjustment, and also a fixation release device for releasing the lock to permit downward rotation of the thigh support frame.

Furthermore, the present invention is particularly well suited for a bench type seat for two passengers wherein the seat frame is designed to accommodate cushion members, the perimeters of which coincide with the left and right sides of the seat frame.

As a result of the present invention, each passenger in a multi-passenger seat frame, especially a two passenger bench type vehicle seat, can comfortably adjust the thigh support individually in an upward direction, without loss of continuous seat-wide support and without detracting from the appearance of the adjusted thigh support and accompanying cushion.

DETAILED DESCRIPTION OF THE INVENTION

Figure 1:
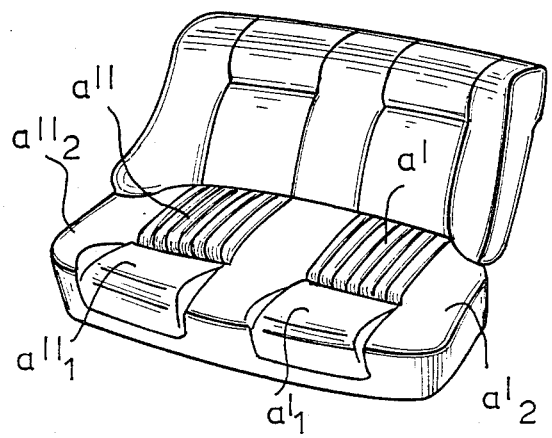
FIG. 1 is a perspective view of a conventional seat for vehicles.

The present invention has minimized the defects of a conventional seat for vehicles as set forth above. Hereinafter, an embodiment of a seat for vehicles according to the present invention will be described with reference to FIGS. 2–6. The same numerical references are marked in each of the Figures so as to correspond with the similar features shown in FIG. 1.

Figure 2:
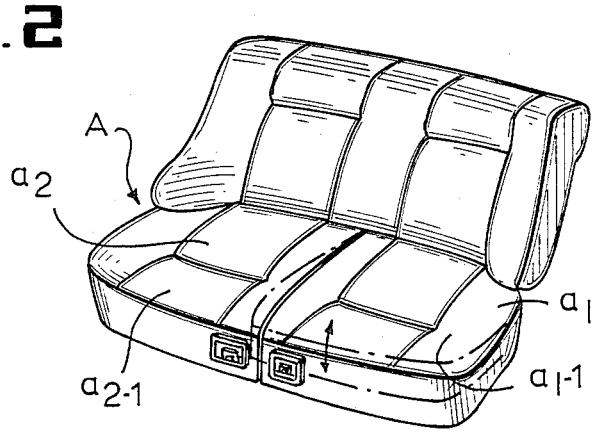
FIG. 2 and FIG. 3 are perspective views of seats for vehicles according to the present invention.
Figure 3:
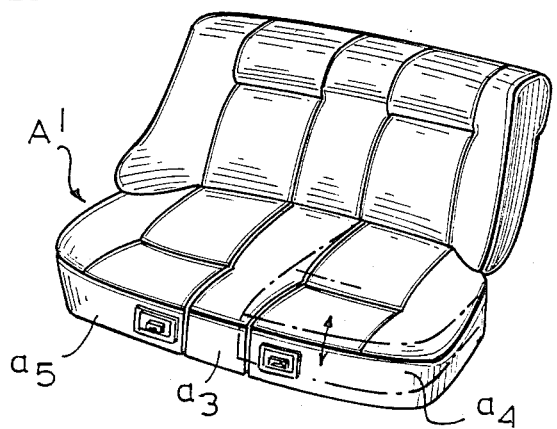
Figure 5:
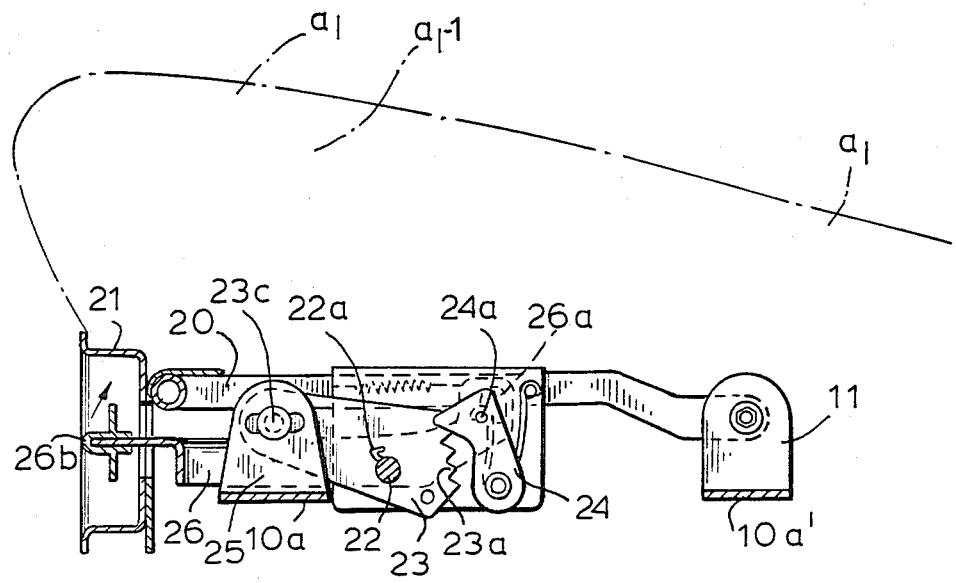

In FIG. 2, a double seat cushion A, split midway in the left and right directions so as to be able to mount cushioning portions $a_1$ and $a_2$, is provided with thigh support devices. In FIG. 3 there is shown a fixed portion $a_3$ arranged at a middle portion in the left and right directions of a double seat cushion A′ so as to be able to mount cushioning portions $a_4$ and $a_5$, respectively, on the left and right sides thereof. At the base portion of the front side of each cushioning portion $a_1$, $a_2$ and $a_4$, $a_5$, the thigh support device of the invention is disposed. Each of the cushioning portions $a_1$, $a_2$ and $a_4$, $a_5$ is respectively formed independently and elevated by means of the thigh support devices mounted respectively therein. Each of the cushioning portions $a_1$, $a_2$ and $a_4$, $a_5$ and each of the thigh support devices are fixed to a seat frame 10 (as seen in FIG. 4) which is designed for at least a double seat.

Figure 4:
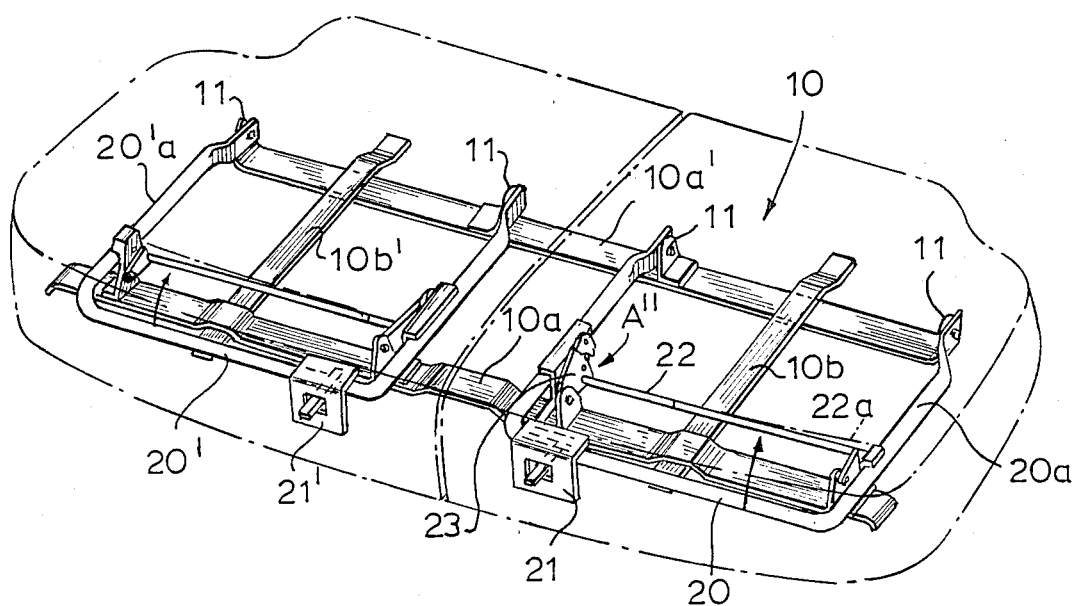
FIG. 4 is a perspective view of the main portion of the seat as shown in FIG. 2, and FIG. 5 and FIG. 6 are, respectively, side views in section of operational states thereof.

FIG. 4 illustrates a double seat frame 10 for the seat A as shown in FIG. 2 and a pair of thigh support devices mounted on the left and right sides of the seat frame 10. The seat frame 10 is composed of front and back longitudinal frame members 10a and 10a′, respectively, each extending substantially the entire length of the double seat A. Transverse frame members 10b and 10b′ are mounted between the longitudinal frame members 10a and 10a′. Braces 11 are secured on the back longitudinal frame member 10a′, to which thigh support frames 20 and 20′ are pivotally fixed for rotation of the frame members in the up and down direction. As seen most clearly in FIG. 4 the thigh support frames 20 and 20′ extend from their pivotal connection on braces 11 to the front longitudinal frame member 10a with the outer sides 20a and 20a' being coextensive with the ends of the double seat frame 10. On each of the thigh support frames 20 and 20' thigh support cushions $a_1$-1 and $a_2$-1 of the cushioning portions $a_1$ and $a_2$ are arranged. The thigh support portions $a_1$-1 and $a_2$-1 can be made of a cushioning member such as a foaming agent and a top layer material covering said cushioning member. The thigh support frames 20 and 20' are also covered with the top layer material.

Since the thigh support frames 20 and 20' also act as thigh lifting levers, the thigh support devices of the present invention, as illustrated, include the thigh support frames 20 and 20', fixed rotatably free to the seat frame 10a and are provided with hooking portions 21 and 21' at the front side thereof, and a locking mechanism A" shown mounted along the thigh support frame 20 and seat frame 10 so as to control the rotation of the thigh support frames.

The depicted locking mechanism A" is pivotally fixed to a rotation shaft 22 arranged on the thigh support frame 20 and is provided with a lock member 23 at one end of said rotation shaft 22 centering around the shaft 22. The locking mechanism also includes a number of locking notches 23a formed in the up and down directions and a pin 23c engaging within a rectangular hole on a bracket 25 which is fixed firmly to the seat frame 10a. A stopper 24 engaging with the locking notches 23a is fixed rotatably free to the thigh support frame 20 and is biased in the engaging direction. A projecting pin 24a is mounted on the stopper 24 for moving the stopper 24 to an unlocked position wherein notches 23a are disengaged from stopper 24.

A lever 26 having an engaging portion 26a for engaging with pin 24a of the stopper 24 is provided for moving the stopper 24 to the unlocked position by engaging pin 24a, and for rotating the lock member 23 in the reverse direction to its biasing direction by fixing same to the thigh support frame 20.

Figure 6:
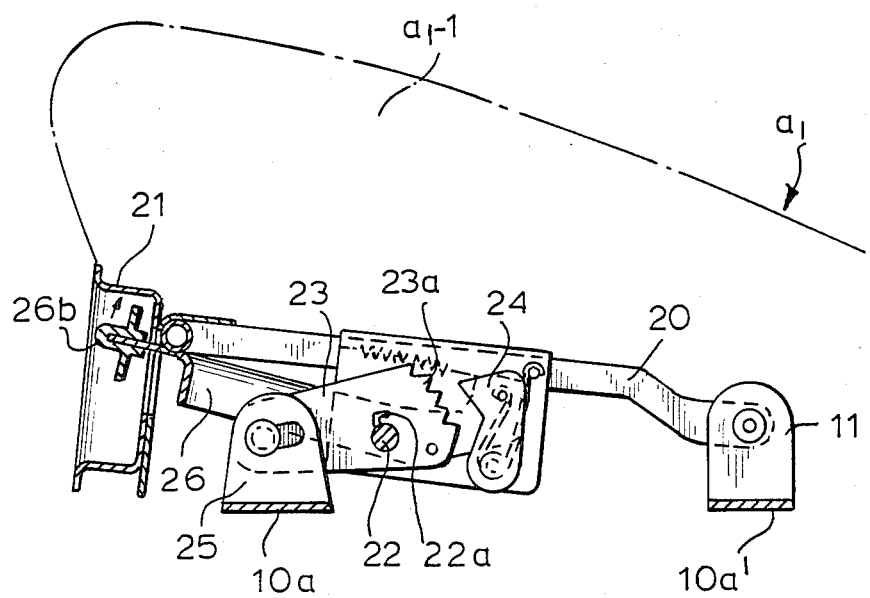

By raising the hooking portion 21 of the thigh support frame 20, the thigh support frame 20 rises accordingly causing the lock member 23 to rotate so as to engage the stopper 24 with a lock notch 23a of the lock member 23 arranged at a suitable position, thereby retaining the thigh support frame 20 at the desired position. A control projection 26b can be provided on the lever 26 which protrudes out of an opening of the hooking portion 21 for unlocking the lock A" from a locked condition of the thigh support frame 20. When the control projection 26b, is raised as shown in FIG. 6, the stopper 24 is pressed to move so as to move to the unlocked condition, thereby permitting return spring 22a to rotate shaft 22 so that the stopper 24 engages with an upper position (FIG. 5) of the lock member 23 so as to be a locking state.

The present invention is not to be limited to the exact thigh support device as illustrated herein, provided that thigh support device is constructed so that the outer sides in the left and right directions of thigh support frames are arranged with a cushioning member thereon in a manner whereby the thigh support devices are substantially coextensive with the right and left outer sides of at least a double seat frame.

As a result of the improved seat for vehicles according to the present invention the thigh support devices are coextensive with the seat frame in the left and right directions so that the corner portions of the seat cushion are elevated simultaneously with the thigh support frames. Therefore, the entire thigh-engaging cushion of a passenger can be raised and lowered simultaneously with no difference in the level between the thigh support portion and the corner portion as usually observed in a conventional seat suspension. Thus, an increased sense of security and comfort is experienced by a passenger.

Furthermore, since the corner portion and the portion supporting the thigh are formed integrally, no expansion is experienced between the corner portion and the thigh support portion as in a conventional seat for vehicles, and also no deformation is caused due to depression of the corner portion of the seat. Thus, the appearance of the seat is enhanced compared with that of conventional seats for vehicles.

We claim:

1. In a seat construction supporting at least two passenger seats which includes a seat frame having a front support member and a rear support member each having a length sufficient to be coextensive with said at least two passenger seats arranged in side-to-side relationship, and at least two transverse frame members extending between said front and rear support members each said transverse frame member supporting one of said passenger seats, an independent thigh support frame for each of said passenger seats, said thigh support frame pivotally connected to said rear support member and extended forward to said front support member and arranged in substantially overlaying relationship therewith, each said thigh support frame formed to receive a cushion member by substantially coextensive support of the perimeter of said cushion, and each said thigh support frame comprising rotation locking means between said frame and said front support member for fixing said frame at various levels of upward pivotal adjustment whereby upward and downward adjustment of said thigh support frame results in a corresponding adjustment of said cushion, while maintaining coplanar thigh support for a passenger seated thereon.

2. The improved seat construction of claim 1 wherein each said rotation locking means further comprises a fixation release device for releasing said locking means to permit downward rotation of said thigh support frame.

* * * * *